(12) United States Patent
Lothspeich et al.

(10) Patent No.: US 11,563,751 B2
(45) Date of Patent: Jan. 24, 2023

(54) METHOD FOR MANAGING A MEMORY

(71) Applicant: Robert Bosch GmbH, Stuttgart (DE)

(72) Inventors: Timo Lothspeich, Weissach (DE); Michael Buchalik, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 283 days.

(21) Appl. No.: 16/695,448

(22) Filed: Nov. 26, 2019

(65) Prior Publication Data

US 2020/0186540 A1   Jun. 11, 2020

(30) Foreign Application Priority Data

Dec. 10, 2018 (DE) .......................... 102018221348.8

(51) Int. Cl.
| | |
|---|---|
| *H04L 9/40* | (2022.01) |
| *B60R 25/34* | (2013.01) |
| *G07C 5/00* | (2006.01) |
| *H04L 67/12* | (2022.01) |

(52) U.S. Cl.
CPC .............. *H04L 63/14* (2013.01); *B60R 25/34* (2013.01); *H04L 63/02* (2013.01); *G07C 5/008* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 5,163,082 | A * | 11/1992 | Karnowski | H04M 1/6505 |
| | | | | 379/88.01 |
| 2008/0159333 | A1* | 7/2008 | Choi | H03M 13/2792 |
| | | | | 370/474 |
| 2008/0175236 | A1* | 7/2008 | Lee | H04N 21/235 |
| | | | | 370/389 |
| 2017/0359365 | A1* | 12/2017 | van den Berg | H04L 63/20 |
| 2020/0059827 | A1* | 2/2020 | Arvidson | H04L 47/32 |

* cited by examiner

*Primary Examiner* — Kaveh Abrishamkar

(74) *Attorney, Agent, or Firm* — Norton Rose Fulbright US LLP; Gerard Messina

(57) ABSTRACT

A computer-implemented method for managing a memory in a network, to which, in particular, a unit for detecting or preventing undesirable network intrusions is assigned. A first message is received by a user of the network, and it is randomly decided whether or not the first message is to be stored in the memory. Depending on the random decision, the first message is stored or is not stored in the memory.

17 Claims, 2 Drawing Sheets

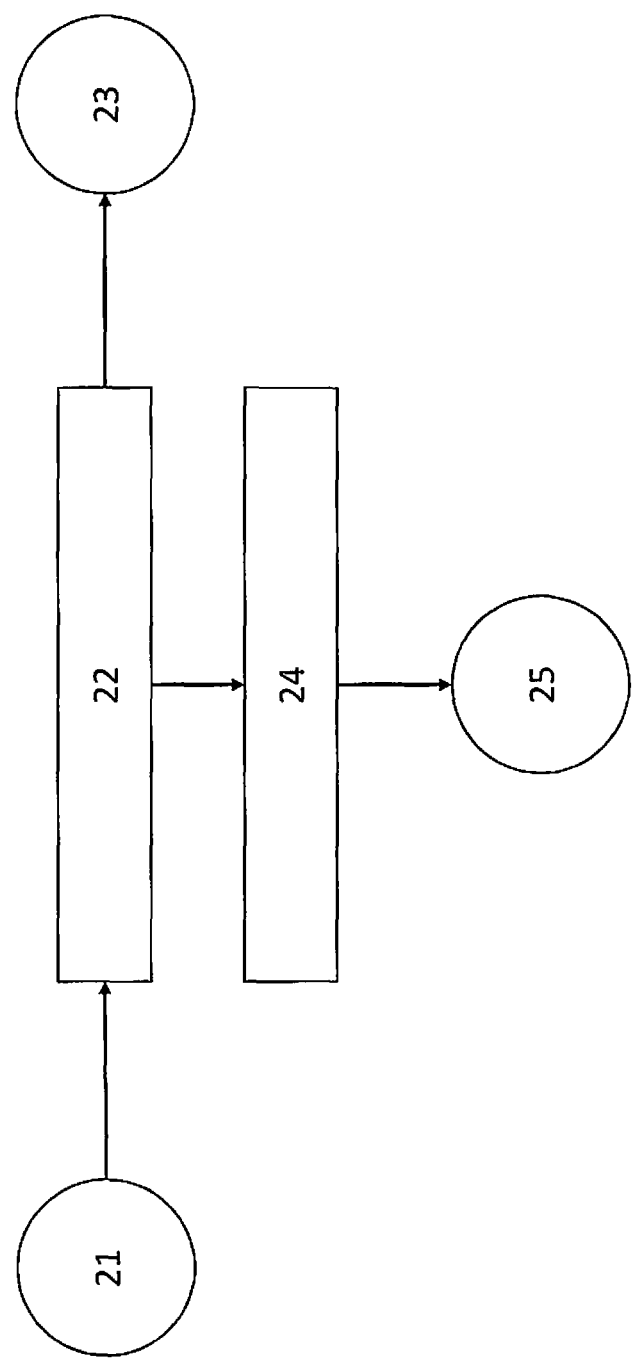

METHOD FOR MANAGING A MEMORY

RELATED APPLICATION INFORMATION

The present application claims priority to and the benefit of German patent application no. DE 10 2018 221 348.8, which was filed in Germany on Dec. 10, 2018, the disclosure of which is incorporated herein by reference.

FIELD OF THE INVENTION

The present invention relates to a method for managing a memory and to a computer program configured therefor.

BACKGROUND INFORMATION

A network-based intrusion detection system for the use in a vehicle is discussed in not previously published patent DE 10 2018 215 945 A1.

SUMMARY OF THE INVENTION

A computer-implemented method for managing a memory in a network, in particular in overload mode, is provided, to which, in particular, a unit for detecting or preventing undesirable network intrusions is assigned.

The network may be wired or wireless, for example an Ethernet network, a CAN or CAN FD bus, a WLAN or a Bluetooth network. In particular, it is a processor network, in particular a communication and/or control network, of a vehicle. The unit for detecting or preventing undesirable network intrusions may, in particular, be an intrusion detection system (IDS), an intrusion detection and prevention system (IDPS) or a firewall.

It is now provided that when a first message is received by a user of the network, it is randomly decided whether or not the first message is to be stored in the memory, and, depending on the random decision, the storage in the memory takes place or does not take place. The participant may be a network user including network interfaces, a storage arrangement/apparatus and at least one processing unit, for example also a gateway of a network. In a vehicle network it may also be a control unit, a central control unit or an on-board computer. The decision may be made by a processing unit, in particular by a processing unit of the user, after a corresponding computer program has been processed. A random generator or a pseudo random generator is used, in particular, to make the decision random.

Using such a method, an input load of a unit for detecting or preventing undesirable network intrusions may be reduced, in particular, to be able to handle limited processing and/or storage resources. The relief takes place in a manner which is not predictable for an attacker so that he or she is not able to take advantage of such a function for attacks. This prevention of attacks or of a deliberate exploitation of a measure for memory management may advantageously not only be implemented in memories of units for detecting or preventing undesirable network intrusions, but also in all possible other network memories, for example of gateways or switches.

One advantageous embodiment is characterized by the further steps:
  randomly selecting a second message from messages stored in the memory if the first message is to be stored;
  deleting the randomly selected second message from the memory; and
  storing the first message in the memory.

This memory management function results in further relief of the memory of the security unit, again in such a way that it is not predictable for the attacker. Here as well, it is made more difficult to take advantage of the memory management properties for an attack.

The described methods may not only be used in an existing overload case of processing or storage capacity, but already if it is established that such an overload case is imminent, or also purely as a precaution.

In an advantageous embodiment, the described methods are used when an overload operation of the memory is established or is imminent, or when a drop below a particular free capacity occurs in the memory, in particular, when the particular free capacity is less than a maximum message size or less than a size of the first message.

The randomized discarding of incoming messages in the overload operation makes it more difficult for an attacker to predict the operating mode of a memory in the overload operation and to channel attacks in the overload operation past a unit for detecting undesirable network intrusions without being noticed. It is thus used, in particular, in the overload operation when the memory is full or at risk of becoming full, and newly incoming messages or already stored messages should necessarily be discarded.

The provided methods make it impossible for a potential attacker to predict which messages are processed or discarded by a security system when an overload case exists or is imminent.

With this, they contribute to the security and robustness of such a system.

In advantageous embodiments of the described methods, the memory includes at least two memory blocks, in particular at least two memory blocks having a capacity sufficient for storing a maximum message size. In this way, further attack possibilities on the security system are reduced, thus making the system even more secure. In a particularly simple and efficient implementation variant, it is possible that always the same of the at least two memory blocks is/are deleted and overwritten for a storage of newly arriving messages.

To keep the loss of information over the received sequence of incoming messages which may be low for the security unit by the provided methods, in one prexemplary referred embodiment meta data with respect to a received message are stored in the memory, in particular, a counter value of a message counter and/or a piece of information about a receive channel via which the message was received. These may be used by the security system for the detection or prevention of attempts to intrude into the network, and thereby make the system more effective. The system may be configured to be particularly robust when the counter value of the message counter is stored prior to shutting down the network or the user of the network, and is incremented further, starting from the stored counter value, after booting. As an alternative, the counter value may randomly be initially determined for the same purpose during a booting of the network or of the user of the network.

The described methods for memory management in the network may be implemented in hardware circuitry, in software or by hardware circuitry and software combined. In particular, a computer program may be configured to carry out such methods. For this purpose, such a computer program is stored in a machine-readable memory in the network, in particular, in a memory of the receiving network user, and is processed by a processing unit in the network, in particular, by a processing unit of the network user.

The present invention is described in greater detail hereafter with reference to the accompanying drawing and based on exemplary embodiments.

BRIEF DESCRIPTION OF THE DRAWINGS

FIG. 2 schematically shows an exemplary method for managing a memory.

DETAILED DESCRIPTION

Figure 1:
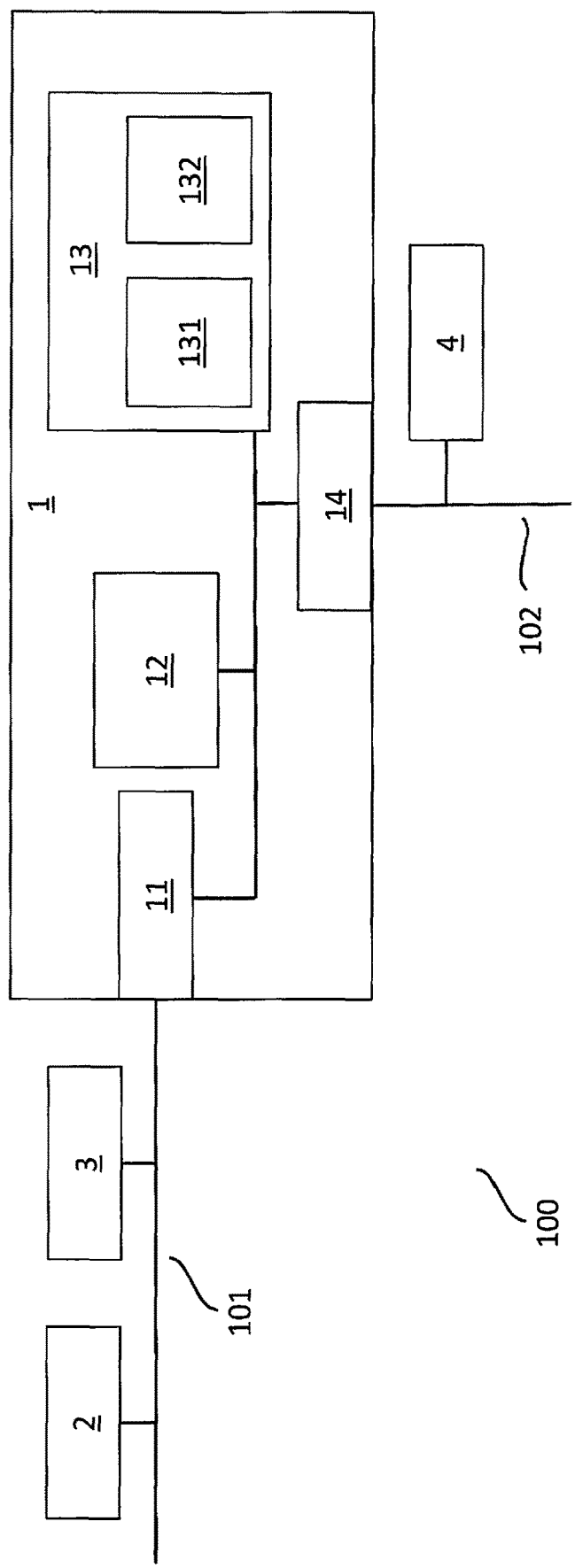
FIG. 1 schematically shows an exemplary network.

Network-based IDS may be used in IT security to monitor the data traffic of a system and check it for known attacks. IDS denotes intrusion detection system and refers to a system having security functions which focus on the identification of intruding attacks on an IT system, for example on a processor network of a vehicle. Whereas a firewall, for example, is to prevent an undesirable intrusion into a system, it is (initially) sufficient for an IDS to identify, for example by subjecting a system behavior to a plausibility check, that such an intrusion is taking place or has taken place. Suitable reactions to this may then be initiated, e.g., also in a combined intrusion detection and prevention system (IDPS).

In contrast to a firewall, the messages do not have to be processed in real time in a network-based IDS. Rather, copies of the messages may be created. The original message may be delivered to the recipient without further delay. The copy of the original message is buffered for the time being to wait for a favorable operating point in time for further processing by the IDS (for example, low utilization of the processing resource). For example, for an Ethernet-based communication, the original message may be received by the switch, a copy may be created by processing using a TCAM rule, and this copy may be forwarded to a processing unit of an IDS in the switch-internal microcontroller.

FIG. 1 shows a network 100 including network user 1, 2, 3, 4 and network links 101 and 102. The network may be wired or wireless. In particular, it is a processor or communication and/or control network of a vehicle. The network may, for example, be an Ethernet network, a CAN or CAN FD bus, a Bluetooth network or a WLAN.

Network user 1 includes an IDS 13 here. For example, network user 1 may be a gateway of network 100. Network user 1 may now receive a message via communication link 101, for example from network user 2 or 3. This message may be received via an interface 11 of network user 1, which, in particular, also includes a buffer memory. A processing unit 12 of network user 1 may control or configure the message reception, the message processing, the management of storage resources and the message dispatch. Messages may be sent via an interface 14 of network user 1, for example, received messages may be forwarded. Interface 14, in particular, also includes a buffer memory. Messages may be sent via communication link 102, for example to network user 4.

IDS 13 of network user 1 includes a memory 131 and, if necessary, a processing unit 132. Received messages may be buffered in memory 131, which may be checked by IDS 13, in particular processing unit 132, for indications of an intrusion process into the network.

Due to the possible chronological decoupling between the receipt of a message by network user 1 and the IDS check of the message, the received messages may be buffered in memory 131 for the time being, where they await further processing. As a result of resource limitations, it is generally not possible to provide so much storage for memory 131 that free storage capacities are guaranteed for every scenario. In an overload scenario, IDS 13 thus runs the risk that no storage capacity for the storage of additional messages exists any longer in memory 131—messages thus have to be discarded.

If conventional queue management mechanisms, such as leaky bucket, are now used for managing the buffer, IDS 13 thus becomes attackable. This is due to the fact that such queue mechanisms in general show a predictable behavior. This characteristic may be taken advantage of by a potential attacker by intentionally driving IDS 13 into an overload scenario. As a consequence, IDS 13 is no longer able to consider any new messages and thus is no longer able to identify any new attacks. During such phases, the attacker then has the chance to carry out the actual attack without being noticed by IDS 13.

Thus, a random-controlled handling of the processing and storage of newly received messages is provided for a system for detecting or preventing an intruding attack into a network, in particular in the overload scenario.

FIG. 2 schematically shows an exemplary sequence for managing a memory.

In a first step 21, it is established by a network user that a new message has been received which is to be stored in a memory of the network user, and the process is started. In step 21, it may additionally be provided that the method is only carried out or continued if a free capacity of the memory drops below a particular threshold, in particular, drops below a maximum message size or the size of the newly received message.

In a second step 22, it is decided by chance for a newly arriving message, in particular through the use of a random generator, whether it is to be stored in a memory to thereupon be able to be checked by the system for detecting or preventing an intruding attack on the network, or whether it is to be discarded. The discarding refers, in particular, only to the purposes of the security system. In particular, in the above-described scenario, upon being received in a buffer memory of the network user, the message may also be forwarded by this network user or be processed otherwise.

If it is decided in step 22 that the message is being discarded, the method branches into step 23. No storage in the memory of the network user for the purpose of a security analysis takes place, and the method is terminated. The message may nonetheless be processed otherwise or be forwarded by the network user.

If it is decided in step 22 that the message is to be stored in the memory, the method branches into step 24. If the method is only carried out if the free storage capacity of the memory drops below a particular threshold or if a corresponding drop is established in a check in step 24, it is decided, again randomly, in step 24 which message already stored in the memory is to be deleted therefrom, so that the new message may be stored accordingly.

The memory requirement of the new message is to be taken accordingly into consideration in the process. The freed-up memory has to correspond at least to the memory requirement of the new message.

Since new attack possibilities may arise therefrom, it is provided that the memory may include at least two blocks, which are able to store a maximum message size.

In a final step 25, the randomly selected message is now deleted from the memory, and the newly received message is stored in the memory.

In an alternative embodiment, it is possible that always the same memory block, for example, always the last or always the first, is utilized for the storage of new, randomly provided to the storage, messages. This results in a simplification in the implementation, but also in new attack possibilities.

The described methods may advantageously be used not only for memories assigned to IDS, but, for example, also for memories assigned to IDPS or firewalls.

The described methods may result in the disadvantage that reception sequences which were previously implicitly defined by the memory management become lost by the random control. In the overload case, however, this is the case anyhow since messages have to be discarded. To nonetheless render corresponding pieces of information visible and, in particular, be able to evaluate them for security purposes by the security system, it is provided that the messages in the memory are enriched with meta data.

Possible meta data are, for example, the value of a counter of the incoming messages, in particular per receive channel, and a piece of information about the respective receive channel via which the message was received. To avoid attack possibilities arising therefrom, it is now provided that a corresponding counter stores the old counter value when the system is being shut down, and increments further, starting from the old value, after the system has been booted, or that, during booting, the die is rolled for a value in a random-controlled manner, from which the counter counts for this operating cycle. The value range of the counter or the random rolling of the die for the starting value may be selected or limited in such a way that replay attacks due to an overflow are avoided.

What is claimed is:

1. A method for managing a memory in a network, to which a unit for detecting or preventing undesirable network intrusions is assigned, the method comprising:
    receiving a first message by a user of the network;
    storing the message in a buffer that is in communication with the memory;
    randomly deciding whether the first message is to be forwarded from the buffer for storage in the memory; and
    when the first message is randomly decided to be forwarded from the buffer to the memory:
        storing the first message in the memory as a function of the random decision, and
        performing a security analysis on the first message stored in the memory.

2. The method of claim 1, further comprising:
    randomly selecting a second message from messages stored in the memory if the first message is to be stored; and
    prior to storing the first message in the memory, deleting the randomly selected second message from the memory.

3. The method of claim 1, wherein the method is used when an overload of the memory is established or imminent, or when a drop below a particular free capacity occurs in the memory.

4. The method of claim 3, wherein the particular free capacity is less than a maximum message size.

5. The method of claim 3, wherein the particular free capacity is less than a size of the first message.

6. The method of claim 1, wherein the memory includes at least two memory blocks.

7. The method of claim 6, wherein at least two of the at least two memory blocks have a capacity sufficient for storing a maximum message size.

8. The method of claim 6, wherein always the same of the at least two memory blocks is deleted and overwritten for a storage of newly arriving messages.

9. The method of claim 1, wherein meta data with respect to a message are stored in the memory, wherein the meta data includes at least one of a counter value of a message counter and a piece of information about a receive channel via which the message was received.

10. The method of claim 9, wherein the counter value is stored prior to shutting down the network or the user of the network, and is incremented further, starting from the stored counter value, after booting.

11. The method of claim 9, wherein the counter value is randomly initially determined during a booting of the network or of the user of the network.

12. The method of claim 1, wherein the network includes an Ethernet network, a CAN bus or a CAN FD bus, a WLAN or a Bluetooth network.

13. The method of claim 1, wherein the network includes a processor network that includes at least one of a communication network and a control network of a vehicle.

14. The method of claim 1, wherein the unit includes an intrusion detection system (IDS), an intrusion detection and prevention system (IDPS) or a firewall.

15. A non-transitory computer readable medium having a computer program, which is executable by a processor, comprising:
    a program code arrangement having program code for managing a memory in a network, to which a unit for detecting or preventing undesirable network intrusions is assigned, by performing the following:
        receiving a first message by a user of the network;
        storing the message in a buffer that is in communication with the memory;
        randomly deciding whether the first message is to be forwarded from the buffer for storage in the memory; and
        when the first message is randomly decided to be forwarded from the buffer to the memory:
            storing the first message in the memory as a function of the random decision, and
            performing a security analysis on the first message stored in the memory.

16. The computer readable medium of claim 15, further comprising:
    randomly selecting a second message from messages stored in the memory if the first message is to be stored; and
    prior to storing the first message in the memory, deleting the randomly selected second message from the memory.

17. A network user, comprising:
    a non-transitory computer readable medium having a computer program, which is executable by a processor, including a program code arrangement having program code for managing a memory in a network, to which a unit for detecting or preventing undesirable network intrusions is assigned, by performing the following:
        receiving a first message by a user of the network;
        storing the message in a buffer that is in communication with the memory;
        randomly deciding whether the first message is to be forwarded from the buffer for storage in the memory; and
        when the first message is randomly decided to be forwarded from the buffer to the memory:

storing the first message in the memory as a function of the random decision, and performing a security analysis on the first message stored in the first message.

\* \* \* \* \*